United States Patent
Kreston, Jr. et al.

(10) Patent No.: US 9,643,328 B2
(45) Date of Patent: May 9, 2017

(54) FOOD SLICING GUIDE

(71) Applicants: Clark E. Kreston, Jr., San Diego, CA (US); Jessica Rhomberg, San Diego, CA (US); Alex Kreston, Las Vegas, NV (US); Clark E. Kreston, Sr., Yorktown, VA (US)

(72) Inventors: Clark E. Kreston, Jr., San Diego, CA (US); Jessica Rhomberg, San Diego, CA (US); Alex Kreston, Las Vegas, NV (US); Clark E. Kreston, Sr., Yorktown, VA (US)

( * ) Notice: Subject to any disclaimer, the term of this patent is extended or adjusted under 35 U.S.C. 154(b) by 280 days.

(21) Appl. No.: 14/272,346

(22) Filed: May 7, 2014

(65) Prior Publication Data

US 2015/0321301 A1    Nov. 12, 2015

(51) Int. Cl.
   *B23Q 3/00*    (2006.01)
   *B26B 29/06*   (2006.01)
   *B23Q 3/18*    (2006.01)

(52) U.S. Cl.
   CPC .............. *B26B 29/063* (2013.01); *B23Q 3/18* (2013.01)

(58) Field of Classification Search
   USPC ........................................................ 269/287
   See application file for complete search history.

(56) References Cited

U.S. PATENT DOCUMENTS

| | | | |
|---|---|---|---|
| 1,098,941 A * | 6/1914 | Collins | B26B 29/063 83/454 |
| 1,703,154 A | 2/1929 | Lanzkron | |
| 3,175,288 A * | 3/1965 | Garwick | B65B 69/0033 30/2 |
| 3,347,296 A | 10/1967 | Rothman | |
| 3,433,278 A * | 3/1969 | Comstock | B26D 1/553 83/404.3 |
| 4,184,397 A | 1/1980 | Jones | |
| 4,302,997 A | 12/1981 | Jones et al. | |
| 4,436,011 A | 3/1984 | Jones | |
| 5,228,668 A | 7/1993 | Guyer | |
| 5,611,266 A | 3/1997 | Kensrue | |
| 5,626,067 A | 5/1997 | Lothe | |
| 5,697,276 A | 12/1997 | Nassau | |
| 5,718,158 A | 2/1998 | Rogge | |
| 5,819,629 A | 10/1998 | Sarich | |
| 5,832,804 A * | 11/1998 | Dudley | B26B 29/06 269/288 |

(Continued)

*Primary Examiner* — Joseph J Hail
*Assistant Examiner* — Alvin Grant
(74) *Attorney, Agent, or Firm* — Roeder & Broder LLP; James P. Broder

(57) ABSTRACT

A food slicing guide for use with a slicing tool that slices a plurality of food items comprises a first body member including a first guide surface, a first recessed surface that is recessed relative to the first guide surface, and a food positioning system; and a second body member including a second guide surface and a second recessed surface that is recessed relative to the second guide surface. The first recessed surface is adapted to retain the plurality of food items. The food positioning system adjusts the position of the plurality of food items relative to the first guide surface. The second guide surface is movably positionable adjacent to the first guide surface to define a slicing gap. The slicing tool is movable within the slicing gap to slice the plurality of food items with a single slice of the slicing tool.

19 Claims, 8 Drawing Sheets

(56) References Cited

U.S. PATENT DOCUMENTS

| | | | |
|---|---|---|---|
| 5,924,352 A * | 7/1999 | Lothe | B26B 29/06 |
| | | | 220/528 |
| 5,946,998 A | 9/1999 | Thompson | |
| 6,164,478 A * | 12/2000 | Cant | A47J 47/005 |
| | | | 220/6 |
| 6,543,322 B2 | 4/2003 | Skoko | |
| 6,637,737 B1 * | 10/2003 | Beecherl | B23Q 1/5406 |
| | | | 269/289 R |
| 6,945,486 B2 * | 9/2005 | Teng | A47J 19/06 |
| | | | 241/169.1 |
| 7,216,574 B2 * | 5/2007 | Woods | B26D 3/30 |
| | | | 30/278 |
| 7,530,558 B2 * | 5/2009 | Casale | A47J 47/005 |
| | | | 269/13 |
| D599,176 S | 9/2009 | Seehoff et al. | |
| 7,661,356 B2 | 2/2010 | Lin | |
| 7,882,641 B2 | 2/2011 | Repac | |
| 8,215,218 B2 | 7/2012 | Al-Heraibi | |
| 8,474,359 B2 * | 7/2013 | George | A47J 47/005 |
| | | | 269/287 |
| 8,677,895 B2 * | 3/2014 | Beber | A47J 43/0711 |
| | | | 241/101.1 |
| 8,757,607 B1 * | 6/2014 | Benaksas | B26B 29/063 |
| | | | 269/289 R |
| 9,066,626 B2 * | 6/2015 | Young | A47J 47/005 |
| 2005/0206060 A1 * | 9/2005 | Siegel | A47J 47/005 |
| | | | 269/289 R |
| 2006/0070226 A1 * | 4/2006 | Daniel | B23Q 3/18 |
| | | | 29/464 |
| 2006/0185488 A1 * | 8/2006 | Short | B26D 1/553 |
| | | | 83/581.1 |
| 2007/0001359 A1 * | 1/2007 | Pearl | A47J 47/005 |
| | | | 269/289 R |
| 2007/0022611 A1 * | 2/2007 | Verbiest | A21C 15/04 |
| | | | 30/114 |
| 2008/0098866 A1 * | 5/2008 | DiPietro | B26D 3/283 |
| | | | 83/440.2 |
| 2009/0096150 A1 * | 4/2009 | Cihan | A47J 47/005 |
| | | | 269/289 R |
| 2011/0180981 A1 * | 7/2011 | Radi | A47J 47/005 |
| | | | 269/16 |
| 2012/0031250 A1 * | 2/2012 | Hocker | B26D 7/0006 |
| | | | 83/821 |
| 2012/0031910 A1 * | 2/2012 | Hogestyn | A47J 36/2477 |
| | | | 220/573.1 |
| 2013/0043633 A1 * | 2/2013 | Schmidt | A47J 47/005 |
| | | | 269/290 |
| 2013/0256963 A1 * | 10/2013 | Shofet | A47J 47/005 |
| | | | 269/13 |
| 2014/0054836 A1 * | 2/2014 | Chen | B26B 29/063 |
| | | | 269/288 |
| 2014/0138893 A1 * | 5/2014 | Khuu | A47J 47/005 |
| | | | 269/289 R |

\* cited by examiner

FOOD SLICING GUIDE

BACKGROUND

Food preparation can be a very time-consuming process for professional chefs, and even everyday home chefs. This can be especially true when the chef is preparing foods for larger numbers of people. For example, chefs may want to prepare a relatively large number of similar food items, such that the food items can be presented in a pleasing manner and be relatively uniform in size. In such situations, the chef may need to slice a number of similar food items, e.g., cherry tomatoes, grape tomatoes, grapes, olives, tomatoes, hard-boiled eggs, etc., so that the food items are relatively uniform in size and shape. Unfortunately, slicing such food items individually can be a time-consuming task, and achieving the desired uniformity in size can often be difficult.

SUMMARY

The present invention is directed toward a food slicing guide for use with a slicing tool that slices a plurality of food items. In certain embodiments, the food slicing guide comprises a first body member and a second body member. The first body member includes a first guide surface, a first recessed surface that is recessed relative to the first guide surface, and a food positioning system. The first recessed surface is adapted to retain the plurality of food items. The food positioning system adjusts the position of the plurality of food items relative to the first guide surface. The second body member includes a second guide surface and a second recessed surface that is recessed relative to the second guide surface. The second guide surface is movably positionable adjacent to the first guide surface to define a slicing gap. The slicing tool is movable within the slicing gap to slice the plurality of food items with a single slice of the slicing tool.

In some embodiments, the food positioning system includes a plurality of first positioners that are positioned spaced apart from one another along the first recessed surface. The plurality of first positioners are adapted to adjust the position of the plurality of food items relative to the first guide surface and to maintain the position of the plurality of food items relative to the first recessed surface when the slicing tool is moved within the slicing gap. Additionally, in one such embodiment, the second body member includes a plurality of second positioners that are positioned spaced apart from one another along the second recessed surface. The plurality of second positioners are adapted to adjust the position of the plurality of food items relative to the second guide surface and to maintain the positioning of the plurality of food items relative to the second recessed surface when the slicing tool is moved within the slicing gap. Further, the food positioning system can further include a resilient, first insert pad that is selectively positionable substantially adjacent to the plurality of first positioners.

Additionally, in certain embodiments, the food positioning system includes a resilient, first insert pad that is selectively positionable substantially adjacent to the first recessed surface. In one such embodiment, the first insert pad has a first thickness, and the food positioning system can further include a resilient, second insert pad that is alternatively positionable substantially adjacent to the first recessed surface, the second insert pad having a second thickness that is different than the first thickness. In another such embodiment, the first insert pad has a first compressibility, and the food positioning system can further include a resilient, second insert pad that is alternatively positionable substantially adjacent to the first recessed surface, the second insert pad having a second compressibility that is different than the first compressibility. Further, in one embodiment, the food slicing guide further comprises a resilient second insert pad that is selectively positionable substantially adjacent to the second recessed surface.

In one embodiment, the first guide surface is recessed a first depth relative to the first guide surface. In such embodiment, the food positioning system can include the first body member having an opposed first alternative guide surface and an opposed first alternative recessed surface that is recessed a first alternative depth from the first alternative guide surface, the first alternative depth being different than the first depth. The first alternative recessed surface is also adapted to retain the plurality of food items. Moreover, in such embodiment, the second guide surface is movably positionable adjacent to the first alternative guide surface to define the slicing gap.

Somewhat similarly, in another embodiment, the first guide surface is again recessed a first depth relative to the first guide surface. Additionally, the food positioning system can again include the first body member having an opposed first alternative guide surface and an opposed first alternative recessed surface that is recessed a first alternative depth from the first alternative guide surface, the first alternative depth being different than the first depth, the first alternative recessed surface being adapted to retain the plurality of food items. Further, in such embodiment, the second guide surface is recessed a second depth relative to the second guide surface. Additionally, the second body member has an opposed second alternative guide surface and an opposed second alternative recessed surface that is recessed a second alternative depth from the second alternative guide surface, the second alternative depth being different than the second depth. Still further, in such embodiment, the second alternative guide surface is movably positionable adjacent to the first alternative guide surface to define the slicing gap.

Additionally, in one embodiment, the food slicing guide further comprises an alignment assembly that selectively aligns the first body member relative to the second body member to define the slicing gap.

As described in detail herein, the present invention is further directed toward a food slicing assembly including a slicing tool and the food slicing guide as described above, wherein the slicing tool is movable within the slicing gap to slice the plurality of food items with a single slice of the slicing tool.

Additionally, in another application, the present invention is further directed toward a food slicing guide for use with a slicing tool that slices a plurality of food items, the food slicing guide comprising (A) a first body member including a first guide surface, a first recessed surface that is recessed a first depth relative to the first guide surface, an opposed first alternative guide surface, and an opposed first alternative recessed surface that is recessed a first alternative depth from the first alternative guide surface, the first alternative depth being different than the first depth, the plurality of food items being selectively retainable by one of the first recessed surface and the first alternative recessed surface; and (B) a second body member including a second guide surface, a second recessed surface that is recessed a second depth relative to the second guide surface, an opposed second alternative guide surface, and an opposed second alternative recessed surface that is recessed a second alternative depth from the second alternative guide surface, the second alternative depth being different than the second depth; wherein the second body member is movably positionable adjacent to the first body member to define a slicing gap therebetween, the slicing tool being movable within the slicing gap to slice the plurality of food items with a single slice of the slicing tool.

Further, in still another application, the present invention is also directed toward a food slicing guide for use with a slicing tool that slices a plurality of food items, the food slicing guide comprising: (A) a first body member including (i) a first guide surface, (ii) a first recessed surface that is recessed a first depth relative to the first guide surface, (iii) an opposed first alternative guide surface, (iv) an opposed first alternative recessed surface that is recessed a first alternative depth from the first alternative guide surface, the first alternative depth being different than the first depth, the plurality of food items being selectively retainable by one of the first recessed surface and the first alternative recessed surface, (v) a plurality of first positioners that are positioned spaced apart from one another along one of the first recessed surface and the first alternative recessed surface, the plurality of first positioners being adapted to adjust the position of the food items relative to the first guide surface, and (vi) a resilient, first insert pad that is selectively positionable substantially adjacent to the plurality of first positioners; and (B) a second body member including (i) a second guide surface, (ii) a second recessed surface that is recessed a second depth relative to the second guide surface, (iii) an opposed second alternative guide surface, (iv) an opposed second alternative recessed surface that is recessed a second alternative depth from the second alternative guide surface, the second alternative depth being different than the second depth, (v) a plurality of second positioners that are positioned spaced apart from one another along one of the second recessed surface and the second alternative recessed surface, the plurality of second positioners being adapted to adjust the position of the food items relative to the second guide surface, and (vi) a resilient, second insert pad that is selectively positionable substantially adjacent to the plurality of second positioners; wherein the second body member is movably positionable adjacent to the first body member to define a slicing gap therebetween, the slicing tool being movable within the slicing gap to slice the plurality of food items with a single slice of the slicing tool.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
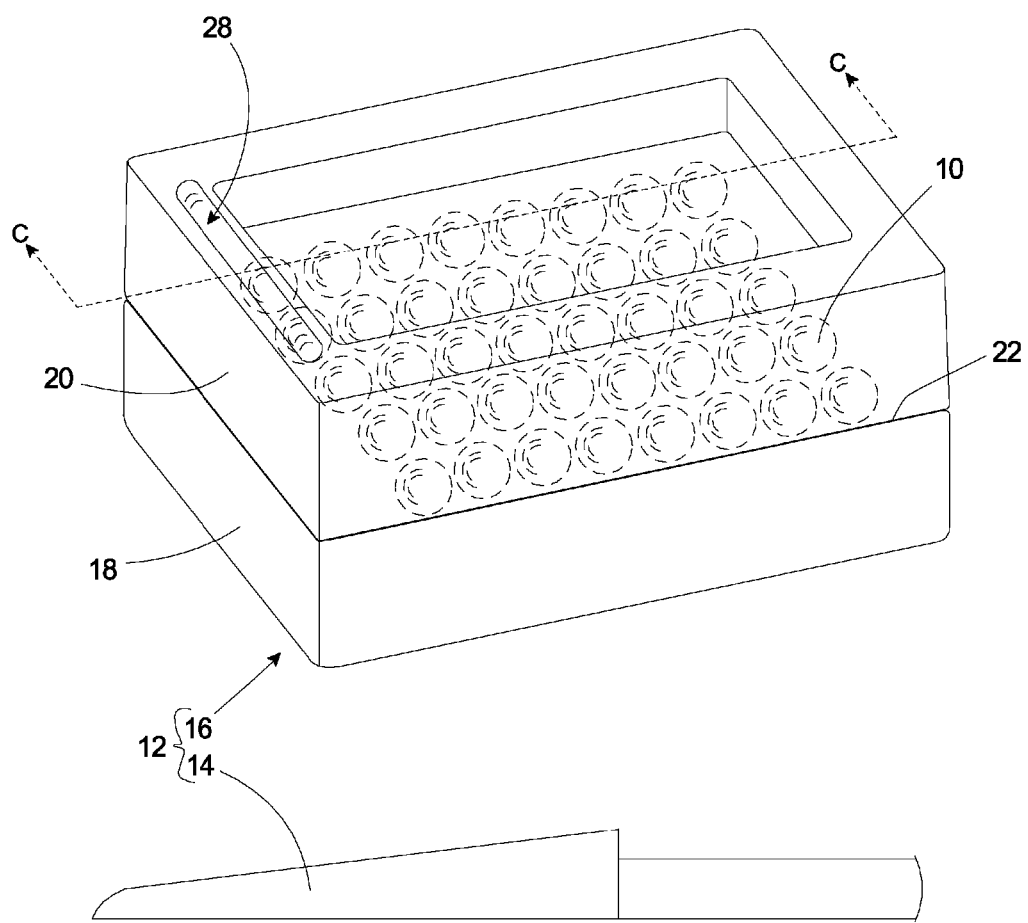
FIG. 1A is a perspective view of a plurality of food items and an embodiment of a food slicing assembly having features of the present invention, the food slicing assembly including a slicing tool and a food slicing guide.

FIG. 1A is a perspective view of a plurality of food items 10 (illustrated in phantom) and an embodiment of a food slicing assembly 12 having features of the present invention. As provided in detail herein, the food slicing assembly 12 is adapted for the retaining and slicing of the plurality of food items 10. The types of food items 10 usable with the food slicing assembly 12 can be varied. In certain non-exclusive applications, the food items 10 usable with the food slicing assembly 12 can include various food items that are at least somewhat symmetrical in shape, and that are commonly prepared for consumption and/or presentation by slicing the food items 10 into two substantially equal halves. For example, in certain applications, the food items 10 usable with the food slicing assembly 12 can include cherry tomatoes, grape tomatoes, grapes, olives, tomatoes, hard-boiled eggs, and/or various other food items that are commonly sliced into substantially equal halves for purposes of food preparation and/or consumption. Additionally and/or alternatively, the food slicing assembly 12 can be used for slicing other types of food items 10. Moreover, it should be appreciated that the food slicing assembly 12 can be utilized for purposes other than slicing the food items 10 into substantially equal halves; and/or additional food preparation steps can be undertaken prior to and/or subsequent to the use of the food slicing assembly 12 to slice the food items 10.

The design of the food slicing assembly 12 can be varied. For example, as shown in the embodiment illustrated in FIG. 1A, the food slicing assembly 12 includes a slicing tool 14 (e.g., a knife), and a food slicing guide 16 (also referred to herein simply as a "slicing guide") that selectively retains the plurality of food items 10 and guides the movement of the slicing tool 14 for slicing of the plurality of food items 10. In various applications, the food slicing assembly 12 is adapted for slicing each of the plurality of food items 10 in a single operation of the food slicing assembly 12, i.e. with a single slice of the slicing tool 14 relative to the slicing guide 16.

As an overview, in certain embodiments, the food slicing guide 16 is adapted to effectively slice various sizes of food items 10 such that each of the food items 10 is sliced approximately into equal halves. For example, in this embodiment, as shown in FIG. 1A, the slicing guide 16 includes a first body member 18 and a second body member 20 that are adjustably positionable relative to one another, with the plurality of food items 10 being selectively retained between the first body member 18 and the second body member 20. Subsequently, the food items 10 are sliced into approximately equal halves by movement of the slicing tool 14 relative to the slicing guide 16 and through each of the food items 10.

More particularly, during use, the first body member 18 is initially positioned on a support surface 21 (illustrated in FIG. 1C), e.g., a countertop and/or a tabletop. Next, the plurality of food items 10 are positioned substantially within the first body member 18, i.e. the first body member 18 is adapted to retain the plurality of food items 10. Subsequently, the second body member 20 is placed on top of the first body member 18 to cover and/or enclose the food items 10 such that the first body member 18 and the second body member 20 are positioned substantially, if not directly, adjacent to one another. However, by means of the body members 18, 20 being separate components from one another, the first body member 18 and the second body member 20 cooperate to define a slicing gap 22 therebetween, wherein the slicing tool 14 can be moved within the slicing gap 22 to slice each of the food items 10 retained within the slicing guide 16. More particularly, during movement of the slicing tool 14 within the slicing gap 22, the first body member 18 and the second body member 20 will be slightly pushed apart from one another to enable the slicing tool 14 to move within and/or through the slicing gap 22. This movement of the slicing tool 14 within and/or through the slicing gap 22 results in the desired slicing of the food items 10 with a single slice of the slicing tool 14 relative to the slicing guide 16, i.e. relative to the first body member 18 and the second body member 20.

Additionally, as described in greater detail herein below, at least one of the first body member 18 and the second body member 20 can include a food positioning system, i.e. the first body member 18 can include a first food positioning system 24 (illustrated, for example, in FIG. 1B) and/or the second body member 20 can include a second food positioning system 26 (illustrated, for example, in FIG. 1B), such that the slicing guide 16 can adjustably position the plurality of food items 10 relative to the slicing gap 22. More specifically, the use of the food positioning systems 24, 26 enables food items 10 of different sizes to be effectively sliced in half by adjusting the position of the food items 10 relative to the slicing gap 22. As provided in detail herein below, the food positioning systems 24, 26 can include various features and aspects that enable the position of the food items 10 to be selectively adjusted relative to the slicing gap 22.

It should be appreciated that the use of the terms "first body member" and "second body member" is merely for purposes of convenience and ease of illustration, and either body member 18, 20 can be referred to as the "first body member" and/or the "second body member". Similarly, it should be appreciated that the use of the terms "first food positioning system" and "second food positioning system" is also merely for purposes of convenience and ease of illustration, and either food positioning system 24, 26 can be referred to as the "first food positioning system" and/or the "second food positioning system".

In different embodiments, the first body member 18 and the second body member 20 can be substantially similar in design to one another, or the body members 18, 20 have designs that are different from one another. As illustrated in this embodiment, each of the body members 18, 20 can be substantially rectangle-shaped, with rounded corners. Alternatively, the body members 18, 20 can have a different shape. For example, in certain alternative embodiments, one or both of the body members 18, 20 can be substantially square-shaped, circle-shaped, oval-shaped, triangle-shaped, hexagon-shaped, octagon-shaped, or another suitable shape.

Further, the first body member 18 and the second body member 20 can be made from any suitable material. For example, in certain non-exclusive alternative embodiments, the first body member 18 and/or the second body member 20 can be made from various plastic materials, composite materials, metallic materials or a combination thereof. Alternatively, the first body member 18 and/or the second body member 20 can be made from other suitable materials.

Additionally, FIG. 1A further illustrates that the slicing guide 16 can include an alignment assembly 28 that selectively aligns the second body member 20 relative to the first body member 18 during use of the slicing guide 16. The alignment assembly 28 can have any suitable design that functions to maintain the positioning of the second body member 20 relative to the first body member 18 to create a consistent slicing gap 22 during a slicing operation. Various embodiments of the alignment assembly 28 will be described in greater detail herein below. Alternatively, the slicing guide 16 can be designed without the alignment assembly 28.

Figure 1B:
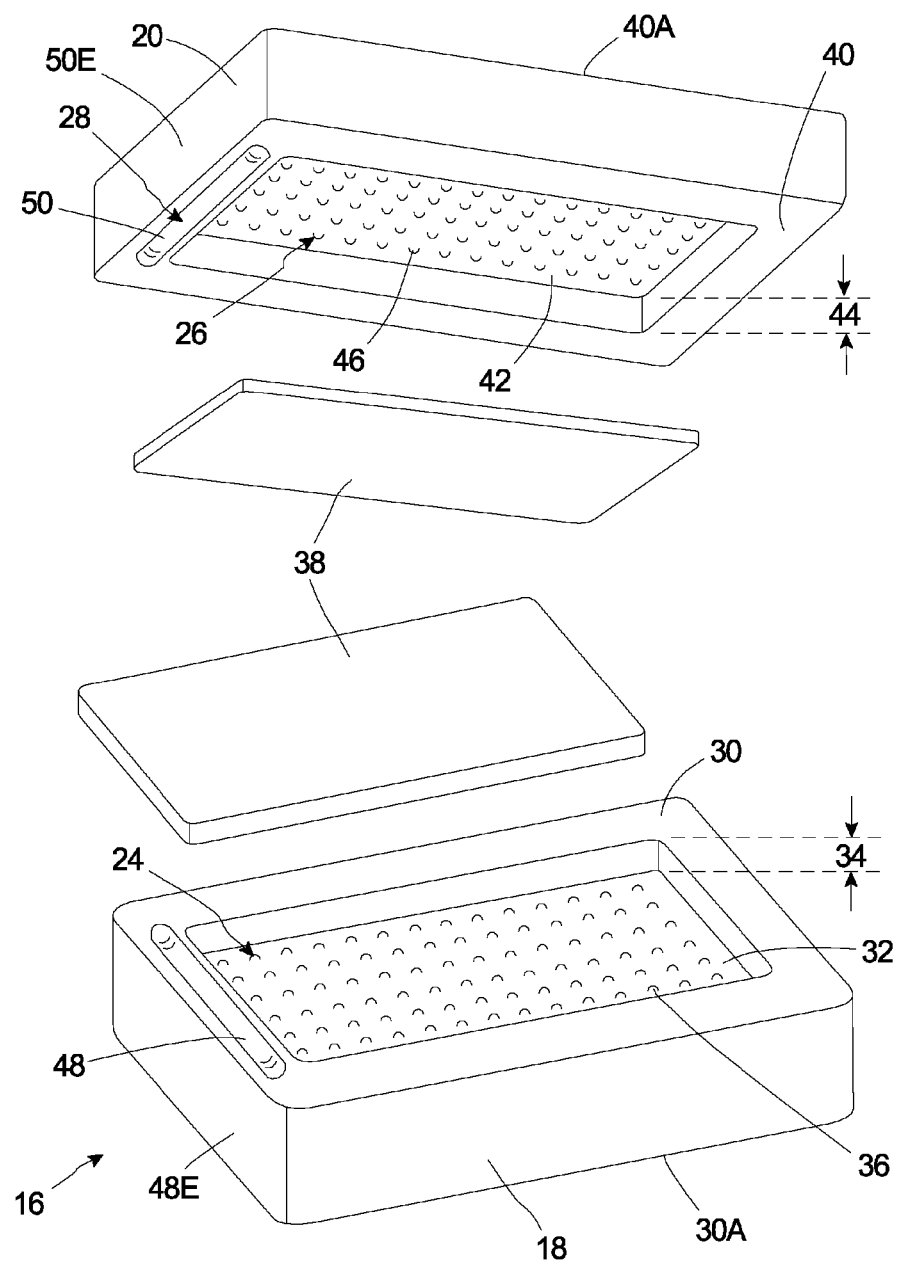
FIG. 1B is an exploded perspective view of the food slicing guide illustrated in FIG. 1A.

FIG. 1B is an exploded view of the food slicing guide 16 illustrated in FIG. 1A. In particular, FIG. 1B illustrates additional details of each of the body members 18, 20, as well as certain aspects that can be included as part of the food positioning systems 24, 26 of the first body member 18 and the second body member 20, respectively.

As noted above, the first body member 18 is adapted to retain the plurality of food items 10 (illustrated in FIG. 1A). Additionally, as noted above, the first body member 18 can be substantially rectangular-shaped or some other suitable shape.

The design of the first body member 18 can be varied to suit the specific requirements of the food slicing guide 16 and/or to suit the specific requirements of the food items 10 to be sliced. In the embodiment illustrated in FIG. 1B, the first body member 18 includes a first guide surface 30 and a first recessed surface 32 that is recessed relative to the first guide surface 30. More particularly, as shown, the first recessed surface 32 is recessed a first depth 34 relative to the first guide surface 30. During use, the first recessed surface 32 is adapted to retain the plurality of food items 10. Additionally, during use, the first guide surface 30 guides the movement of the slicing tool 14 (illustrated in FIG. 1A) as the slicing tool 14 slices the plurality of food items 10.

Further, as noted, the first body member 18 can include the first food positioning system 24. The first food positioning system 24 adjusts the position of the plurality of food items 10 relative to the first guide surface 30. The various features and aspects that can be included as part of the first positioning system 24 can be varied. More particularly, the first positioning system 24 can include more features or fewer features than those specifically illustrated in the Figures. Additionally, the features of the first positioning system 24 can be used individually and/or in any desired combination to accommodate various sizes of food items 10.

As illustrated in FIG. 1B, the first positioning system 24 can include a plurality of first positioners 36 that are positioned spaced apart from one another along the first recessed surface 32. Additionally, as illustrated, the first positioning system 24 can include one or more insert pads 38 (two are illustrated in FIG. 1B) that can be selectively positioned within the first body member 18, i.e. substantially and/or directly adjacent to the first recessed surface 32. Alternatively, the first positioning system 24 and/or the first body member 18 can be designed without the first positioners 36 and/or without the insert pads 38.

The first positioners 36 can laterally and/or vertically adjust the position of the food items 10 that are positioned within the first body member 18 relative to the first guide surface 30. For example, in one embodiment, the first positioners 36 can be a plurality of small bumps or protrusions, e.g., substantially circular bumps or protrusions, that extend away from the first recessed surface 32. With this design, for example, the position of the food items 10 can be adjusted such that the food items 10 are positioned substantially between the first positioners 36. Alternatively, the first positioners 36 can include a plurality of indentations that are formed along and/or into the first recessed surface 32 such that the food items 10 can be positioned substantially within the indentations. Still alternatively, the first positioners 36 can have another suitable design. Moreover, regardless of the specific design, the first positioners 36 can be utilized to help maintain the positioning of the food items 10 within the first body member 18 during a slicing operation, i.e. while the slicing tool 14 is moved within the slicing gap 22 to slice the food items 10.

The insert pads 38 can be utilized to adjust the vertical position of the food items 10 relative to the first guide surface 30. In certain embodiments, the insert pads 38 can be formed from a resilient material, e.g., various relatively soft plastics, foam materials, neoprene, or other suitable materials, such that the food items 10 can be securely maintained in position within the first body member 18 during a slicing operation, without damaging the food items 10, e.g., the outer surface of the food items 10. The insert pads 38 can have any desired thickness and/or any desired compressibility to suit the requirements of the slicing guide 16 and/or to suit the requirements of the specific food items 10 to be sliced.

Similarly, the design of the second body member 20 can be varied to suit the specific requirements of the food slicing guide 16 and/or to suit the specific requirements of the food items 10 to be sliced. In one embodiment, the second body member 20 includes a second guide surface 40 and a second recessed surface 42 that is recessed relative to the second guide surface 40. More particularly, the second recessed surface 42 can be recessed a second depth 44 relative to the second guide surface 40. During use, the second guide surface 40 can be selectively and movably positioned substantially adjacent to the first guide surface 30, such that the food items 10 are effectively retained between the first recessed surface 32 and the second recessed surface 42. Additionally, in such orientation, the second guide surface 40, along with the first guide surface 30, guides the movement of the slicing tool 14 as the slicing tool 14 is used to slice the plurality of food items 10. With this orientation of the first body member 18 and the second body member 20, the first guide surface 30 and the second guide surface 40 cooperate to define the slicing gap 22 (illustrated in FIG. 1A) through which the slicing tool 14 moves to slice the food items 10.

Further, as noted, the second body member 20 can include the second food positioning system 26. The second food positioning system 26 adjusts the position of the plurality of food items 10 relative to the second guide surface 40 (and/or relative to the first guide surface 30). The various features and aspects that can be included as part of the second positioning system 26 can be varied. More particularly, the second positioning system 26 can include more features or fewer features than those specifically illustrated in the Figures. Additionally, the features of the second positioning system 26 can be used individually and/or in any desired combination to accommodate various sizes of food items 10. Moreover, the features of the second positioning system 26 can be used in any desired combination with any of the features of the first positioning system 24.

In this embodiment, the second positioning system 26 can include a plurality of second positioners 46 that are positioned spaced apart from one another along the second recessed surface 42. Additionally, as illustrated, the second positioning system 26 can also include the one or more insert pads 38 that can be selectively positioned within the second body member 20, i.e. substantially and/or directly adjacent to the second recessed surface 42. Alternatively, the second positioning system 26 and/or the second body member 20 can be designed without the second positioners 46 and/or without the insert pads 38.

The second positioners 46 can be substantially similar in design and function to the first positioners 36. More specifically, the second positioners 46 can laterally and/or vertically adjust the position of the food items 10 that are positioned and/or extend within the second body member 20 relative to the second guide surface 30. For example, in one embodiment, the second positioners 46 can be a plurality of small bumps or protrusions, e.g., substantially circular bumps or protrusions, that extend away from the second recessed surface 42. With this design, the position of the food items 10 can be adjusted such that the food items 10 are positioned substantially between the second positioners 46. Alternatively, the second positioners 46 can include a plurality of indentations along and/or into the second recessed surface 42 such that the food items 10 can be positioned substantially within the indentations. Still alternatively, the second positioners 46 can have another suitable design. Moreover, regardless of the specific design, the second positioners 46 can be utilized to help maintain the positioning of the food items 10 within the second body member 20 during a slicing operation, i.e. while the slicing tool 14 is moved within the slicing gap 22 to slice the food items 10.

It is appreciated that in certain embodiments, the second body member 20 can be substantially a mirror image of the first body member 18, i.e. with the exception of the portions of the alignment assembly 28, which will be described in greater detail below.

As above, the insert pads 38 can be utilized to adjust the vertical position of the food items 10 relative to the second guide surface 40. More specifically, the insert pads 38 can be formed from a resilient material such that the food items 10 can be securely maintained in position within the second body member 20 during a slicing operation, without damaging the food items 10. The insert pads 38 can be chosen to have any desired thickness and/or any desired compressibility to suit the requirements of the slicing guide 16 and/or to suit the requirements of the specific food items 10 to be sliced.

As will be discussed in greater detail herein below, in certain embodiments, the first body member 18 and/or the second body member 20 can be reversible. More specifically, (i) the first body member 18 can include a first alternative guide surface 30A that faces in the opposite direction from the first guide surface 30, and a first alternative recessed surface 32A (illustrated in FIG. 1C) that is recessed a first alternative depth 34A (illustrated in FIG. 1C) from the first alternative guide surface 30A; and/or (ii) the second body member 20 can include a second alternative guide surface 40A that faces in the opposite direction from the second guide surface 40, and a second alternative recessed surface 42A (illustrated in FIG. 1C) that is recessed a second alternative depth 44A (illustrated in FIG. 1C) from the second alternative guide surface 40A. The potential reversibility of the first body member 18 and/or the second body member 20 can also be included as part of the first food positioning system 24 and/or the second food positioning system 26, respectively. Stated in another manner, (i) the reversing of the first body member 18, i.e. such that the food items 10 will be retained within the first body member 18 substantially and/or directly adjacent to the first alternative recessed surface 32A, adjusts the position of the food items 10 relative to the first guide surface 30; and (ii) the reversing of the second body member 20, i.e. such that the food items 10 will be positioned substantially and/or directly adjacent to the second alternative recessed surface 42A, adjusts the position of the food items 10 relative to the second guide surface 40 (and/or the first guide surface 30). With both the first body member 18 and the second body member 20 in such reversed positions, during use, the first alternative guide surface 30A and the second alternative guide surface 40A will be positioned adjacent to one another such that the first alternative guide surface 30A and the second alternative guide surface 40A cooperate to define the slicing gap 22. Alternatively, in some embodiments, the first body member 18 and/or the second body member 20 can be designed such that the body members 18, 20 are not reversible, i.e. cannot be used in such alternative or reversed positions.

It should be appreciated that in some embodiments, the first alternative recessed surface 32A can also include a plurality of first positioners 36 that are formed along the first alternative recessed surface 32A; and the second alternative recessed surface 42A can also include a plurality of second positioners 46 that are formed along the second alternative recessed surface 42A. Additionally, it should be appreciated, that when the first body member 18 and/or the second body member 20 are utilized in the reversed manner, the insert pads 38 can be positioned substantially and/or directly adjacent to the first alternative recessed surface 32A and/or the second alternative recessed surface 42A to adjust the position of the food items 10 relative to the alternative guide surfaces 30A, 40A to the extent desired.

Further, FIG. 1B also illustrates one design of the alignment assembly 28. In particular, in this embodiment, the alignment assembly 28 includes an elongated groove 48 that is formed into the first guide surface 30 of the first body member 18 near an alignment end 48E of the first body member 18; and an elongated protrusion 50 that is formed along the second guide surface 40 of the second body member 20 near an alignment end 50E of the second body member 20. During use of the slicing guide 14, the body members 18, 20 are aligned relative to one another by fitting the elongated protrusion 50 within the elongated groove 48. It should be appreciated that an elongated groove can also be formed into the first alternative guide surface 30A, and an elongated protrusion can also be formed along the second alternative guide surface 40A, such that the body members 18, 20 can be effectively aligned relative to one another when one or both of the body members 18, 20 are utilized in the reversed position.

Figure 1C:
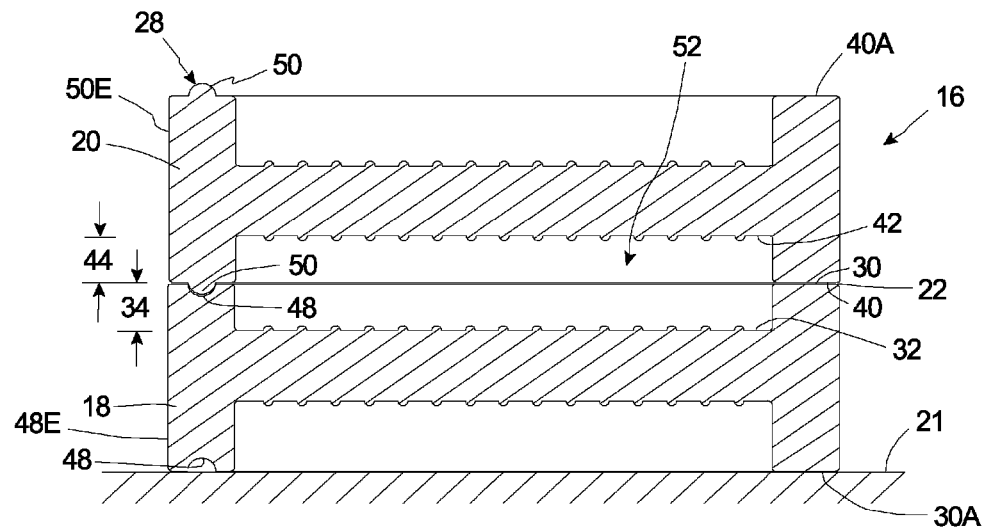
FIG. 1C is a sectional view of the food slicing guide taken on line C-C in FIG. 1A.

FIG. 1C is a sectional view of the food slicing guide 16 taken on line C-C in FIG. 1A. In particular, FIG. 1C illustrates the slicing guide 16 positioned on the support surface 21, wherein the second guide surface 40 has been movably positioned substantially and/or directly adjacent to the first guide surface 30. In this position, the first guide surface 30 and the second guide surface 40 cooperate to define the slicing gap 22 through which the slicing tool 14 (illustrated in FIG. 1A) can be moved to slice the plurality of food items 10 (illustrated in FIG. 1A) that are being retained within the slicing guide 16.

Additionally, FIG. 1C further illustrates the first recessed surface 32 being recessed the first depth 34 from the first guide surface 30, and the second recessed surface 42 being recessed the second depth 44 from the second guide surface 40. It should be appreciated that the combination of the first depth 34 and the second depth 44 form a food cavity 52 that is designed to accommodate a certain general size of food items 10 such that such food items 10 can be sliced in substantially equal halves by the slicing tool 14 with a single slice of the slicing tool 14 relative to the slicing guide 16. Additionally, it should also be appreciated that the size, i.e. the depth, of the food cavity 52 can be varied with the potential use of one or more insert pads 38 (illustrated in FIG. 1B), which, as noted, can be of different thickness and compressibility. With this design, the slicing guide 16 can accommodate food items of different thicknesses, while still enabling the slicing tool 14 to slice the food items 10 into substantially equal halves.

In one embodiment, the first depth 34 can be substantially equal to the second depth 44. Alternatively, the first depth 34 can be different than, i.e. greater than or less than, the second depth 44.

Further, FIG. 1C also demonstrates the proper functioning of one embodiment of the alignment assembly 28. More specifically, in this embodiment, the elongated protrusion 50 that is formed along the second guide surface 40 near the alignment end 50E of the second body member 20 is adapted to be positioned substantially within the elongated groove 48 that is formed into the first guide surface 30 near the alignment end 48E of the first body member 18. With this design, the second body member 20 can be easily maintained in position relative to the first body member 18 during use of the slicing guide 16. Moreover, in one embodiment, as shown, the first body member 18 can also include an elongated groove 48 that is formed into the first alternative guide surface 30A near the alignment end 48E of the first body member 18; and the second body member 20 can also include an elongated protrusion 50 that is formed along the second alternative guide surface 40A near the alignment end 50E of the second body member 20. With this design, one or both of the first body member 18 and the second body member 20 can be used in a reversed position, and the alignment assembly 28 will still enable the proper alignment between the body members 18, 20.

Figure 1D:
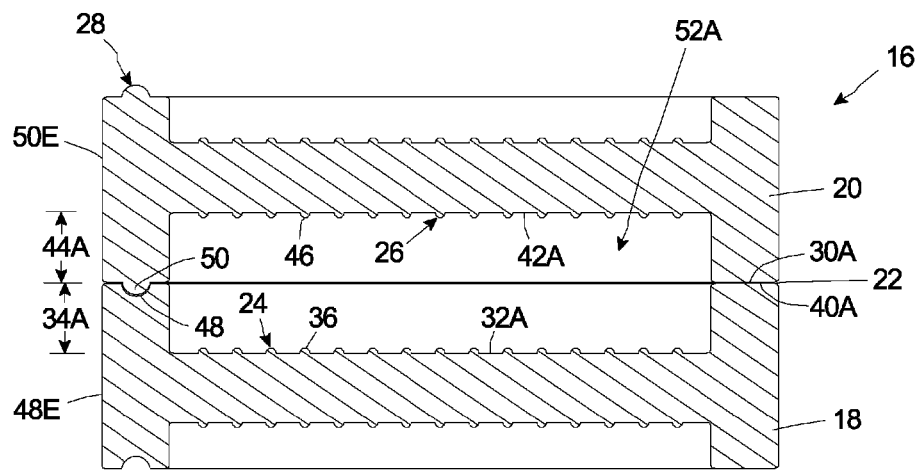
FIG. 1D is another sectional view of the food slicing guide illustrated in FIG. 1A.

FIG. 1D is another sectional view of the food slicing guide 16 illustrated in FIG. 1A. In particular, FIG. 1D is a sectional view very similar to what is illustrated in FIG. 1C, but with each of the first body member 18 and the second body member 20 inverted, i.e. flipped over, to be used in the reversed position. More specifically, FIG. 1D illustrates the slicing guide 16 wherein the second alternative guide surface 40A has been movably positioned substantially and/or directly adjacent to the first alternative guide surface 30A. As noted above, in this embodiment, the reversibility of the first body member 18 is incorporated as part of the first food positioning system 24; and the reversibility of the second body member 20 is incorporated as part of the second food positioning system 26. In this alternative position, the first alternative guide surface 30A and the second alternative guide surface 40A cooperate to define the slicing gap 22 through which the slicing tool 14 (illustrated in FIG. 1A) can be moved to slice the plurality of food items 10 (illustrated in FIG. 1A) that are being retained within the slicing guide 16.

Additionally, FIG. 1D further illustrates the first alternative recessed surface 32A being recessed the first alternative depth 34A from the first alternative guide surface 30A, and the second alternative recessed surface 42A being recessed the second alternative depth 44A from the second alternative guide surface 40A. It should be appreciated that the combination of the first alternative depth 34A and the second alternative depth 44A to form an alternative food cavity 52A that is designed to accommodate a certain general size of food items 10 such that such food items 10 can be sliced in substantially equal halves by the slicing tool 14 with a single slice of the slicing tool 14 relative to the slicing guide 16. Additionally, it should also be appreciated that the size, i.e. the depth, of the alternative food cavity 52A can further be varied with the potential use of one or more insert pads 38 (illustrated in FIG. 1B), which, as noted, can be of different thickness and compressibility. With this design, the slicing guide 16 can accommodate food items of different thicknesses, while still enabling the slicing tool 14 to slice the food items 10 into substantially equal halves.

In one embodiment, the first alternative depth 34A can be substantially equal to the second alternative depth 44A. Alternatively, the first alternative depth 34A can be different than, i.e. greater than or less than, the second alternative depth 44A. Additionally, the first alternative depth 34A can be the same as or different than the first depth 34 (illustrated in FIG. 1C) and/or the second depth 44 (illustrated in FIG. 1C); and the second alternative depth 44A can be the same as or different than the first depth 34 and/or the second depth 44. Moreover, depending on the dimensions of the depths 34, 34A, 44, 44A, the alternative food cavity 52A can be larger (deeper) than, the same depth as, or smaller (less deep) than the food cavity 52 (illustrated in FIG. 1C).

It should be appreciated that the different sizes (i.e. depths) of the possible food cavities 52, 52A that can be formed by having one or both of the body members 18, 20 being reversible, as well as through the potential use of positioners 36, 46 and/or insert pads 38, can create a more flexible slicing guide 16 that can accommodate food items 10 of various different sizes while still enabling the food items 10 to be sliced into substantially equal halves. Stated in another manner, the first food positioning system 24 and/or the second food positioning system 26 effectively function to adjust the position of the food items 10 relative to the slicing gap 22 (and/or the guide surfaces being used to define the slicing gap 22) such that the slicing guide 16 can accommodate food items 10 of various different sizes while still enabling the food items 10 to be sliced into substantially equal halves. It is this flexibility of the slicing guide 16, i.e. the ability to slice food items 10 of various sizes into substantially equal halves, which provides the user with a significant advantage over any other food slicing products.

Further, FIG. 1D also demonstrates the proper functioning of the alignment assembly 28 when each of the body members 18, 20 is in the reversed position. More specifically, the elongated protrusion 50 that is formed along the second alternative guide surface 40A near the alignment end 50E of the second body member 20 is adapted to be positioned substantially within the elongated groove 48 that is formed into the first alternative guide surface 30A near the alignment end 48E of the first body member 18. With this design, the second body member 20 can be easily maintained in position relative to the first body member 18 during use of the slicing guide 16.

Figure 2A:
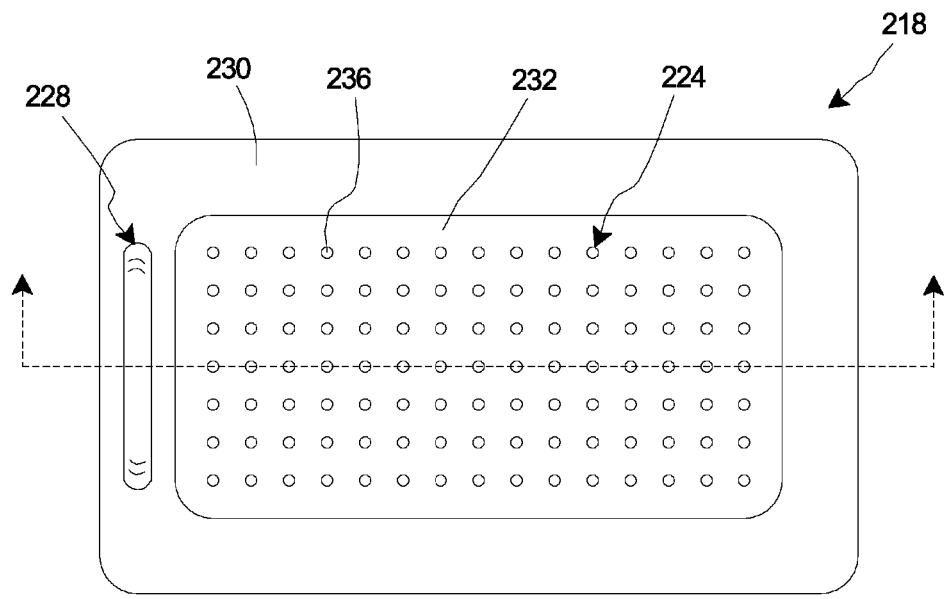
FIG. 2A is a simplified top view of an embodiment of a body member usable as part of the food slicing guide.

FIG. 2A is a simplified top view of an embodiment of a body member 218 usable as part of the food slicing guide 16. In particular, in certain applications, the body member 218 illustrated in FIG. 2A can be utilized as the first body member 18 and/or the second body member 20 illustrated in FIG. 1A, for example. As described herein, the body member 218 is designed to be used in conjunction with and/or substantially adjacent to an additional body member, which can be of a substantially similar design or a different design.

The design of the body member 218 can be varied. In the embodiment illustrated in FIG. 2A, the body member 218 includes a guide surface 230 for guiding the movement of the slicing tool 14 (illustrated in FIG. 1A) through the plurality of food items 10 (illustrated in FIG. 1A), and a recessed surface 232 that is recessed relative to the guide surface 230. Additionally, the body member 218 also includes certain features that are usable as part of a food positioning system 224. For example, as shown, the body member 218 includes a plurality of positioners 236 that are formed along the recessed surface 232. The positioners 236 can have any suitable design for adjusting the lateral and/or vertical positioning of the food items 10 that are retained within the body member 218 relative to the guide surface 230. Moreover, as shown more clearly in FIG. 2B, the body member 218 is reversible such that the body member 218 can be used with the guide surface 230 and the recessed surface 232 facing in a generally inward direction toward the food items 10 and the slicing gap 22 (illustrated in FIG. 1A), and/or the body member 218 can be used with an alternative guide surface 230A (illustrated in FIG. 2B) and an alternative recessed surface 232A (illustrated in FIG. 2B) facing in a generally inward direction toward the food items 10 and the slicing gap 22.

Additionally, FIG. 2A also illustrates that the body member 218 can include at least a portion of an alignment assembly 228 for aligning the body member 218 relative to an adjacent body member.

Figure 2B:
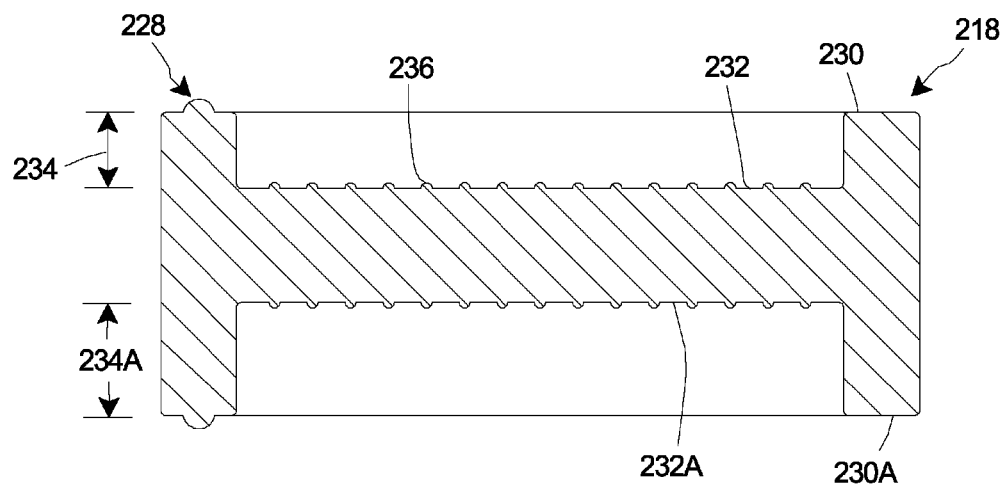
FIG. 2B is a sectional view of the body member taken on line B-B in FIG. 2A.

FIG. 2B is a sectional view of the body member 218 taken on line B-B in FIG. 2A. In particular, FIG. 2B illustrates that the body member 218 includes the guide surface 230, the recessed surface 232 that is recessed a recess depth 234 relative to the guide surface 230, the alternative guide surface 230A, and the alternative recessed surface 232A that is recessed an alternative recess depth 234A from the alternative guide surface 230A. Additionally, FIG. 2B also illustrates the positioners 236 that are formed along the recessed surface 232 and the alternative recessed surface 232A. Further, FIG. 2B illustrates the design of one portion of the alignment assembly 228 that can be used for aligning the body member 218 relative to an adjacent body member.

Figure 3A:
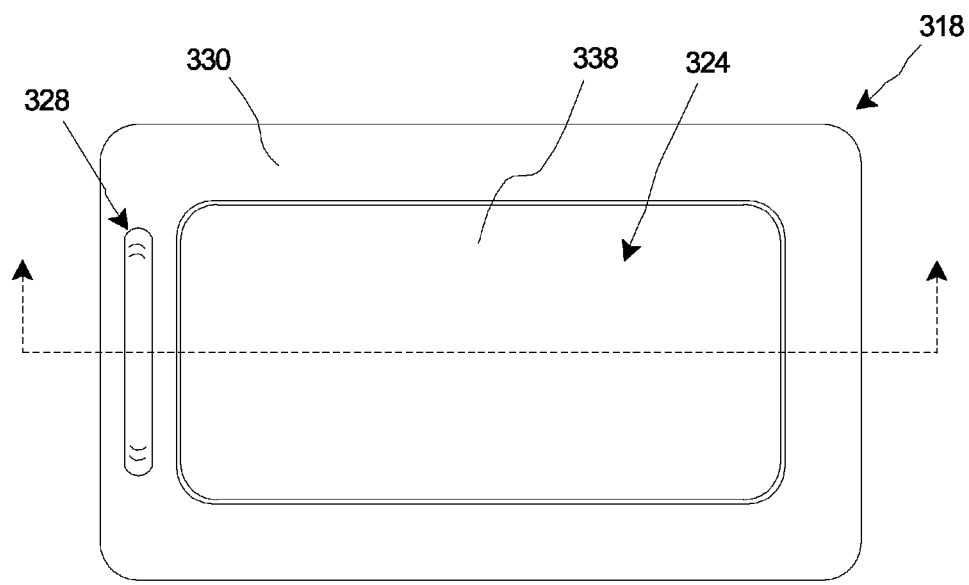
FIG. 3A is a simplified top view of an embodiment of a body member usable as part of the food slicing guide, and an insert pad inserted within the body member.
Figure 3B:
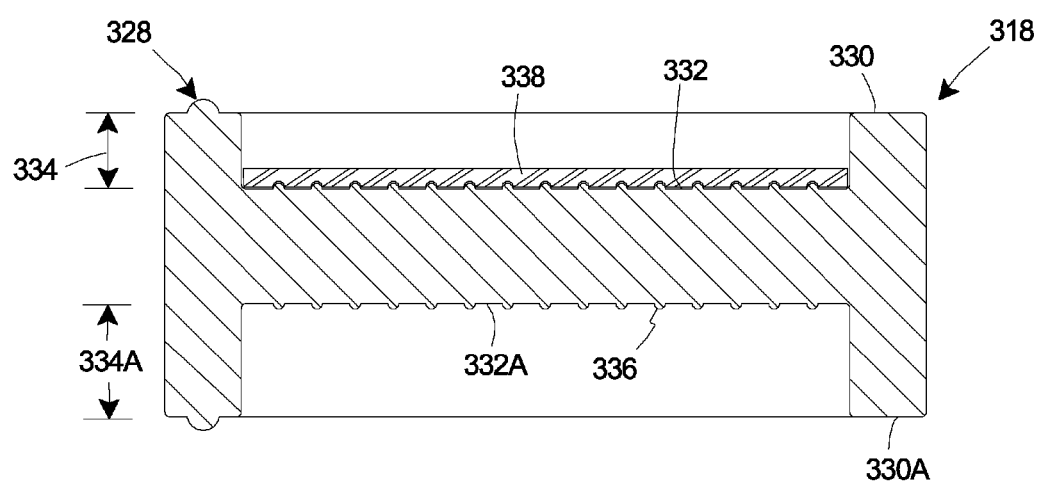
FIG. 3B is a sectional view of the body member and the insert pad taken on line B-B in FIG. 3A.

FIG. 3A is a simplified top view of an embodiment of a body member 318 usable as part of the food slicing guide 16, and an insert pad 338 inserted within the body member 318. Additionally, FIG. 3B is a sectional view of the body member 318 and the insert pad 338 taken on line B-B in FIG. 3A. As with the previous embodiment, in certain applications, the body member 318 illustrated in FIG. 3A can be utilized as the first body member 18 and/or the second body member 20 illustrated in FIG. 1A. Moreover, as described herein, the body member 318 is again designed to be used in conjunction with and/or substantially adjacent to an additional body member, which can be of a substantially similar design or a different design.

As illustrated, the body member 318 is substantially similar to the body member 218 illustrated and described above in relation to FIGS. 2A and 2B. For example, the body member 318 is reversible and again includes a guide surface 330, a recessed surface 332 that is recessed a recess depth 334 relative to the guide surface 330, an alternative guide surface 330A, and an alternative recessed surface 332A that is recessed an alternative recess depth 334A relative to the alternative guide surface 330A. Additionally, the body member 318 also includes a plurality of positioners 336 that are formed along each of the recessed surface 332 and the alternative recessed surface 332A, and a portion of an alignment assembly 328 for aligning the body member 318 relative to an adjacent body member.

However, in this embodiment, the food positioning system 324 of the body member 318 further includes one or more insert pads 338 (only one is illustrated in FIGS. 3A and 3B) that can be selectively positioned substantially adjacent to the recessed surface 332 and/or the alternative recessed surface 332A. As above, the insert pads 338 can be utilized to adjust the vertical position of the food items 10 (illustrated in FIG. 1A) relative to the guide surface 330. Additionally, the insert pads 338 can be formed from a resilient material such that the food items 10 can be securely maintained in position within the body member 318 during a slicing operation, without damaging the food items 10. Further, the insert pads 338 can be chosen to have any desired thickness and/or any desired compressibility to suit the requirements of the slicing guide 16 and/or to suit the requirements of the specific food items 10 to be sliced.

Figure 4:
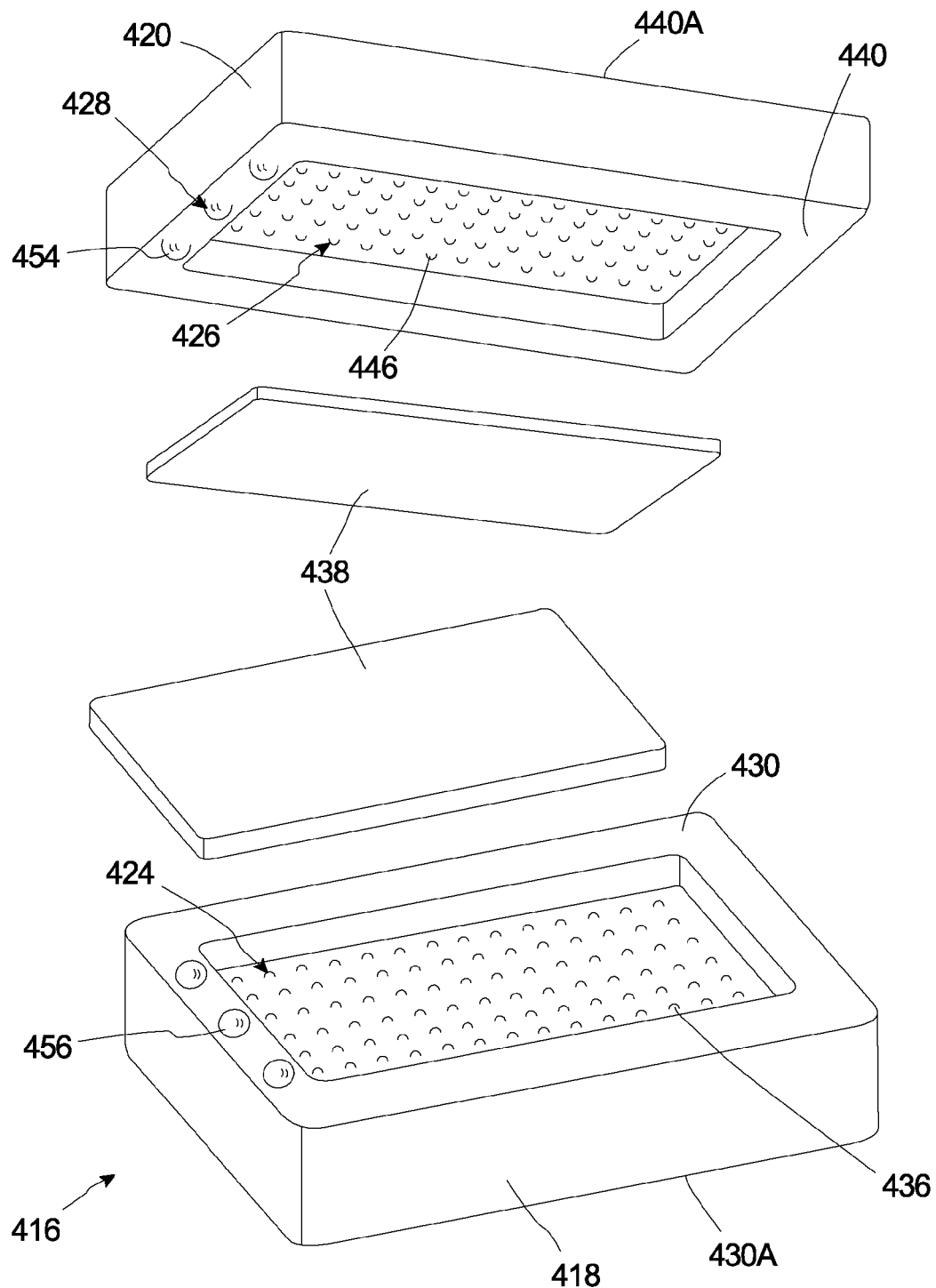
FIG. 4 is an exploded perspective view of another embodiment of the food slicing guide.

FIG. 4 is an exploded perspective view of another embodiment of a food slicing guide 416. The food slicing guide 416 can be substantially similar in design and function to the slicing guide 16 illustrated and described in detail above. For example, the slicing guide 416 includes a first body member 418 and a second body member 420 that are substantially similar in design and function to the first body member 18 and the second body member 20 illustrated and described in detail above. More specifically, the first body member 418 and the second body member 420 are movably positionable relative to one another, the body members 418, 420 cooperating to define a slicing gap (not illustrated) therebetween. With this design, as above, the slicing tool 14 (illustrated in FIG. 1A) can be moved within the slicing gap to slice each of the food items 10 (illustrated in FIG. 1A) retained within the slicing guide 416. Moreover, the body members 418, 420 also include a first food positioning system 424 and a second food positioning system 426, respectively, that again can include the features of first positioners 436, and second positioners 446, the insert pads 438, and reversibility of the body members 418, 420 that adjust the position of the plurality of food items 10 (illustrated in FIG. 1A) relative to the slicing gap 22 (illustrated in FIG. 1A).

However, in this embodiment, the slicing guide 416 includes an alignment assembly 428 for aligning the position of the second body member 420 relative to the first body member 418 that is somewhat different than in the previous embodiment. More particularly, in this embodiment, the alignment assembly 428 comprises (i) a plurality of bumps or protrusions 454 that are formed along the second guide surface 440 and/or the second alternative guide surface 440A of the second body member 420; and (ii) a corresponding plurality of indentations 456 that are formed into the first guide surface 430 and/or the first alternative guide surface 430A of the first body member 418. The protrusions 454 and the corresponding indentations 456 can have any suitable shape, e.g., round, squared, rectangular, such that the protrusions 454 fit within the indentations 456 to effectively maintain the position of the second body member 420 relative to the first body member 418 during use of the slicing guide 416.

Figure 5:
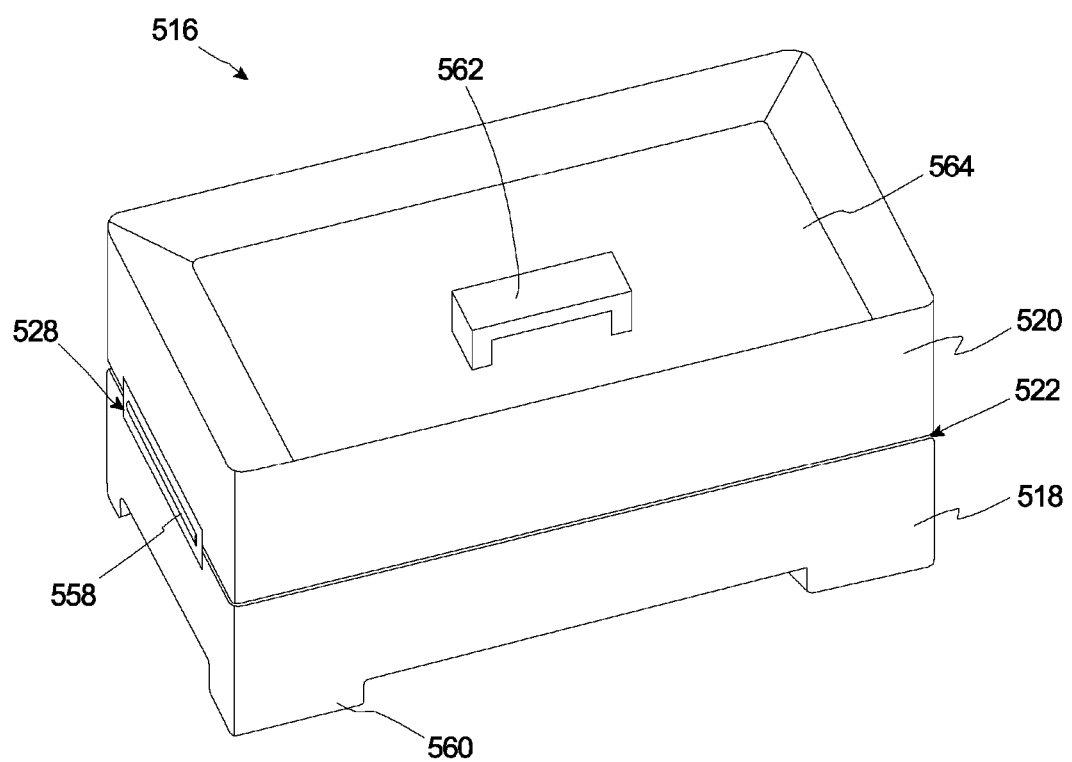
FIG. 5 is a perspective view of still another embodiment of the food slicing guide illustrated.

FIG. 5 is a perspective view of still another embodiment of a food slicing guide 516. The food slicing guide 516 can be somewhat similar in design and function to the slicing guides 16, 416 illustrated and described in detail above. For example, the slicing guide 516 again includes a first body member 518 and a second body member 520 that are movably positionable relative to one another, with the plurality of food items 10 (illustrated in FIG. 1A) being selectively retained between the first body member 518 and the second body member 520. Additionally, the first body member 518 and the second body member 520 again cooperate to define a slicing gap 522 therebetween, wherein the slicing tool 14 (illustrated in FIG. 1A) can be moved within the slicing gap 522 to slice each of the food items 10 retained within the slicing guide 516. Further, the body members 518, 520 also include food positioning systems (not illustrated) that again can include the features of positioners (not illustrated) and insert pads (not illustrated) that adjust the position of the plurality of food items 10 (illustrated in FIG. 1A) relative to the slicing gap 522.

However, in this embodiment, the body members 518, 520 are not reversible, and the slicing guide 516 includes an alignment assembly 528 for aligning the position of the second body member 520 relative to the first body member 518 that is different than in the previous embodiments. More particularly, in this embodiment, the alignment assembly 528 comprises a hinge 558 that hingedly couples the first body member 518 and the second body member 520. With this design, the alignment assembly 528, i.e. the hinge 558, easily enables the proper alignment of the body members 518, 520 relative to one another during use of the slicing guide 516. However, the use and positioning of the hinge 558, as shown in FIG. 5, does not enable the body members 518, 520 to be reversed in position relative to one another.

Additionally, in this embodiment, with the body members 518, 520 not being reversible, (i) the first body member 518 can include a plurality of feet 560 that are adapted to contact the support surface 21 (illustrated in FIG. 1C) in a non-skid manner; and (ii) the second body member 520 can include a handle 562 positioned on an outer surface 564, e.g. an upper surface, for the user to grasp for better control of the slicing guide 516 during use. Alternatively, the first body member 518 can be designed without the feet 560, and/or the second body member 520 can be designed without the handle 562.

Figure 6:
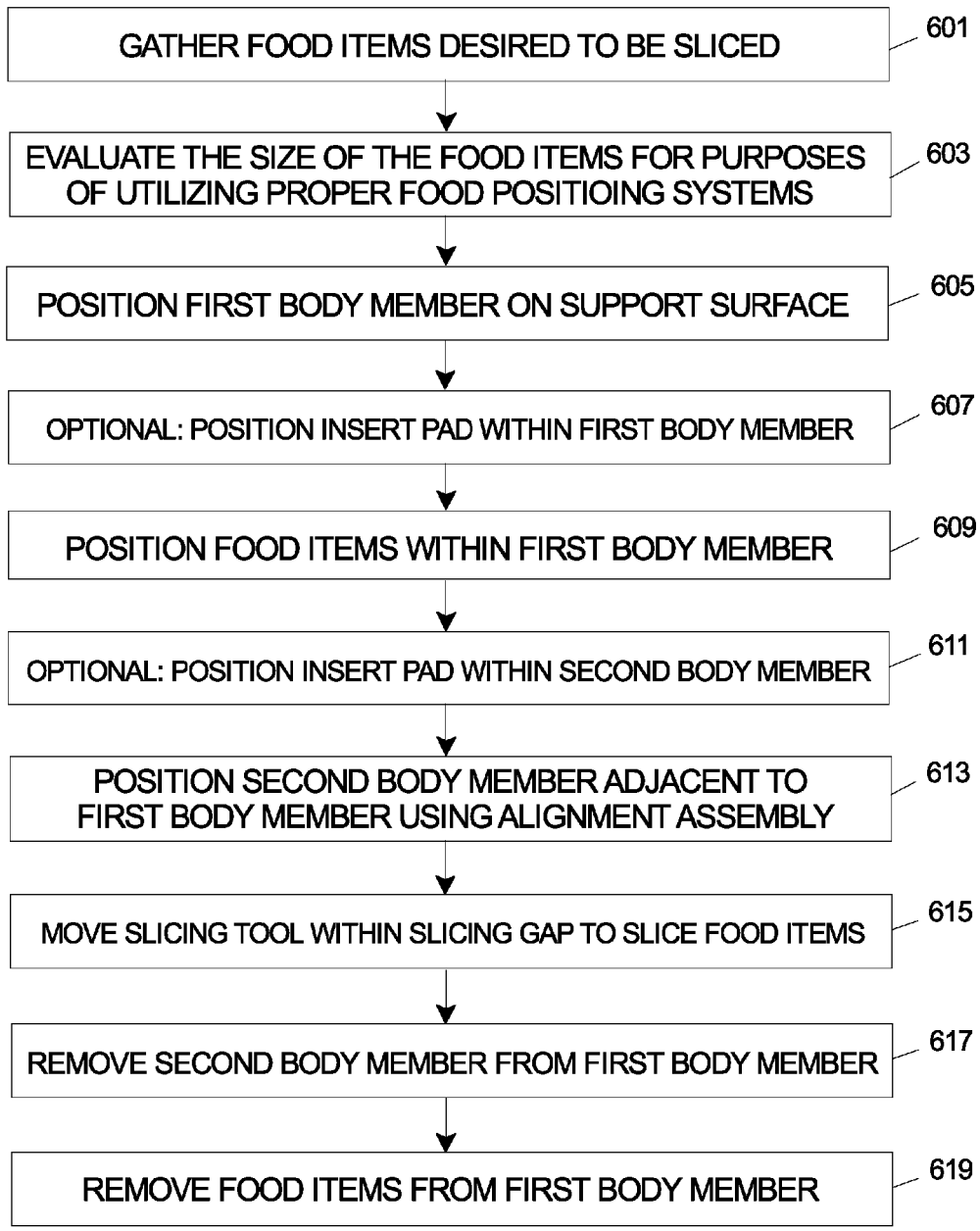
FIG. 6 is a flow chart that illustrates the steps for slicing the plurality of food items through use of the slicing tool and the food slicing guide.

FIG. 6 is a flow chart that illustrates the steps that a user undertakes during a procedure for slicing the plurality of food items through use of the slicing tool and the food slicing guide. In step 601, the user gathers the plurality of food items that it is desired to slice. In step 603, the user evaluates the size of the food items such that the user can effectively utilize the food positioning systems as necessary for generating the desired slices of the food items.

In step 605, the user positions a first body member of the food slicing guide on a support surface. The user should ensure that the first body member is oriented as desired based on the evaluated size of the food items. In optional step 607, an insert pad of desired thickness and/or compressibility can be positioned within the first body member substantially adjacent to a recessed surface of the first body member.

In step 609, the plurality of food items are positioned within the first body member on the recessed surface, or the insert pad, if the insert pad has been positioned within the first body member.

In optional step 611, an insert pad of desired thickness and/or compressibility can be positioned within a second body member substantially adjacent to a recessed surface of the second body member. In step 613, the second body member is placed over top of and adjacent to the first body member to cover the plurality of food items. During this step, the alignment assembly should be utilized to ensure that the body members are positioned properly relative to one another with a guide surface of the second body member positioned adjacent to a guide surface of the first body member thereby defining a slicing gap therebetween.

In step 615, a slicing tool is moved within the slicing gap to slice the food items with a single slice of the slicing tool.

In step 617, the second body member is removed from its position adjacent to the first body member.

Finally, in step 619, the successfully sliced plurality of food items are removed from the first body member and used as desired.

While a number of exemplary aspects and embodiments of the food slicing assembly 12 and the food slicing guide 16 have been discussed above, those skilled in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A food slicing guide for use with a slicing tool that slices a plurality of food items, the food slicing guide comprising:
    a first body member including a first guide surface, a first recessed surface that is recessed relative to the first guide surface, and a food positioning system, the first recessed surface being adapted to retain the plurality of food items, the first recessed surface being recessed a first depth relative to the first guide surface, the food positioning system adjusting the position of the plurality of food items relative to the first guide surface, the food positioning system including the first body member having an opposed first alternative guide surface and an opposed first alternative recessed surface that is recessed a first alternative depth from the first alternative guide surface, the first alternative depth being different than the first depth, the first alternative recessed surface being adapted to retain the plurality of food items; and
    a second body member including a second guide surface and a second recessed surface that is recessed relative to the second guide surface, the second guide surface being movably positionable adjacent to the first alternative guide surface to define a slicing gap, the slicing tool being movable within the slicing gap to slice the plurality of food items with a single slice of the slicing tool.

2. The food slicing guide of claim 1 wherein the food positioning system includes a plurality of first positioners that are positioned spaced apart from one another along the first recessed surface, the plurality of first positioners being adapted to adjust the position of the plurality of food items relative to the first guide surface and to maintain the position of the plurality of food items relative to the first recessed surface when the slicing tool is moved within the slicing gap.

3. The food slicing guide of claim 2 wherein the second body member includes a plurality of second positioners that are positioned spaced apart from one another along the second recessed surface, the plurality of second positioners being adapted to adjust the position of the plurality of food items relative to the second guide surface and to maintain the positioning of the plurality of food items relative to the second recessed surface when the slicing tool is moved within the slicing gap.

4. The food slicing guide of claim 1 wherein the first insert pad has a first thickness, and wherein the food positioning system further includes a resilient, second insert pad that is alternatively positionable substantially adjacent to the first recessed surface, the second insert pad having a second thickness that is different than the first thickness.

5. The food slicing guide of claim 1 wherein the first insert pad has a first compressibility, and wherein the food positioning system further includes a resilient, second insert pad that is alternatively positionable substantially adjacent to the first recessed surface, the second insert pad having a second compressibility that is different than the first compressibility.

6. The food slicing guide of claim 1 further comprising a resilient second insert pad that is selectively positionable substantially adjacent to the second recessed surface.

7. The food slicing guide of claim 1 further comprising an alignment assembly that selectively aligns the first body member relative to the second body member to define the slicing gap.

8. A food slicing assembly including a slicing tool and the food slicing guide of claim 1, wherein the slicing tool is movable within the slicing gap to slice the plurality of food items with a single slice of the slicing tool.

9. A food slicing guide for use with a slicing tool that slices a plurality of food items, the food slicing guide comprising:
    a first body member including (i) a first guide surface, (ii) a first recessed surface that is recessed a first depth relative to the first guide surface, (iii) an opposed first alternative guide surface, (iv) an opposed first alternative recessed surface that is recessed a first alternative depth from the first alternative guide surface, the first alternative depth being different than the first depth, the plurality of food items being selectively retainable by one of the first recessed surface and the first alternative recessed surface, (v) a plurality of first positioners that are positioned spaced apart from one another along one of the first recessed surface and the first alternative recessed surface, the plurality of first positioners being adapted to adjust the position of the food items relative to the first guide surface, and (vi) a resilient, first insert pad that is selectively positionable substantially adjacent to the plurality of first positioners; and
    a second body member including (i) a second guide surface, (ii) a second recessed surface that is recessed a second depth relative to the second guide surface, (iii) an opposed second alternative guide surface, (iv) an opposed second alternative recessed surface that is recessed a second alternative depth from the second alternative guide surface, the second alternative depth being different than the second depth, (v) a plurality of second positioners that are positioned spaced apart from one another along one of the second recessed surface and the second alternative recessed surface, the plurality of second positioners being adapted to adjust the position of the food items relative to the second guide surface, and (vi) a resilient, second insert pad that is selectively positionable substantially adjacent to the plurality of second positioners;
    wherein the second body member is movably positionable adjacent to the first body member to define a slicing gap therebetween, the slicing tool being movable within the slicing gap to slice the plurality of food items with a single slice of the slicing tool.

10. A food slicing guide for use with a slicing tool that slices a plurality of food items, the food slicing guide comprising:
    a first body member including a first guide surface, an opposed first alternative guide surface, a first recessed surface that is recessed a first depth relative to the first guide surface, an opposed first alternative recessed surface that is recessed a first alternative depth from the first alternative guide surface, the first alternative depth being different than the first depth, and a food positioning system, the first recessed surface being adapted to retain the plurality of food items, and the first alternative recessed surface being adapted to alternatively retain the plurality of food items; and a second body member including a second guide surface and a second recessed surface that is recessed relative to the second guide surface, the second guide surface being movably positionable adjacent to the first guide surface to define a slicing gap, and the second guide surface being alternatively movably positionable adjacent to the first alternative guide surface to define the slicing gap, the slicing tool being movable within the slicing gap to slice the plurality of food items with a single slice of the slicing tool;

wherein the food positioning system adjusts the position of the plurality of food items relative to the first guide surface.

11. The food slicing guide of claim 10 wherein the second guide surface is recessed a second depth relative to the second guide surface; wherein the second body member has an opposed second alternative guide surface and an opposed second alternative recessed surface that is recessed a second alternative depth from the second alternative guide surface, the second alternative depth being different than the second depth; and wherein the second alternative guide surface is movably positionable adjacent to the first alternative guide surface to define the slicing gap.

12. The food slicing guide of claim 10 wherein the food positioning system includes a plurality of first positioners that are positioned spaced apart from one another along the first recessed surface, the plurality of first positioners being adapted to adjust the position of the plurality of food items relative to the first guide surface and to maintain the position of the plurality of food items relative to the first recessed surface when the slicing tool is moved within the slicing gap.

13. The food slicing guide of claim 12 wherein the second body member includes a plurality of second positioners that are positioned spaced apart from one another along the second recessed surface, the plurality of second positioners being adapted to adjust the position of the plurality of food items relative to the second guide surface and to maintain the positioning of the plurality of food items relative to the second recessed surface when the slicing tool is moved within the slicing gap.

14. The food slicing guide of claim 12 wherein the food positioning system further includes a resilient, first insert pad that is selectively positionable substantially adjacent to the plurality of first positioners.

15. The food slicing guide of claim 14 wherein the first insert pad has a first thickness, and wherein the food positioning system further includes a resilient, second insert pad that is alternatively positionable substantially adjacent to the plurality of first positioners, the second insert pad having a second thickness that is different than the first thickness.

16. The food slicing guide of claim 14 further comprising a resilient second insert pad that is selectively positionable substantially adjacent to the second recessed surface.

17. The food slicing guide of claim 10 further comprising an alignment assembly that selectively aligns the first body member relative to the second body member to define the slicing gap.

18. A food slicing assembly including a slicing tool and the food slicing guide of claim 10, wherein the slicing tool is movable within the slicing gap to slice the plurality of food items with a single slice of the slicing tool.

19. A food slicing guide for use with a slicing tool that slices a plurality of food items, the food slicing guide comprising:

a first body member including a first guide surface, a first recessed surface that is recessed relative to the first guide surface, and a food positioning system, the first recessed surface being adapted to retain the plurality of food items, the first recessed surface being recessed a first depth relative to the first guide surface, the first body member having an opposed first alternative guide surface and an opposed first alternative recessed surface that is recessed a first alternative depth from the first alternative guide surface, the first alternative depth being different than the first depth, the first alternative recessed surface being adapted to retain the plurality of food items, the food positioning system adjusting the position of the plurality of food items relative to the first guide surface; and a second body member including a second guide surface and a second recessed surface that is recessed relative to the second guide surface, the second guide surface being movably positionable adjacent to the first guide surface to define a slicing gap, the slicing tool being movable within the slicing gap to slice the plurality of food items with a single slice of the slicing tool, the second recessed surface being recessed a second depth relative to the second guide surface, the second body member having an opposed second alternative guide surface and an opposed second alternative recessed surface that is recessed a second alternative depth from the second alternative guide surface, the second alternative depth being different than the second depth;

wherein the second alternative guide surface is movably positionable adjacent to the first alternative guide surface to define the slicing gap.

* * * * *